W. A. FOX.
EGG TESTER.
APPLICATION FILED MAY 17, 1916.
1,210,788.
Patented Jan. 2, 1917.
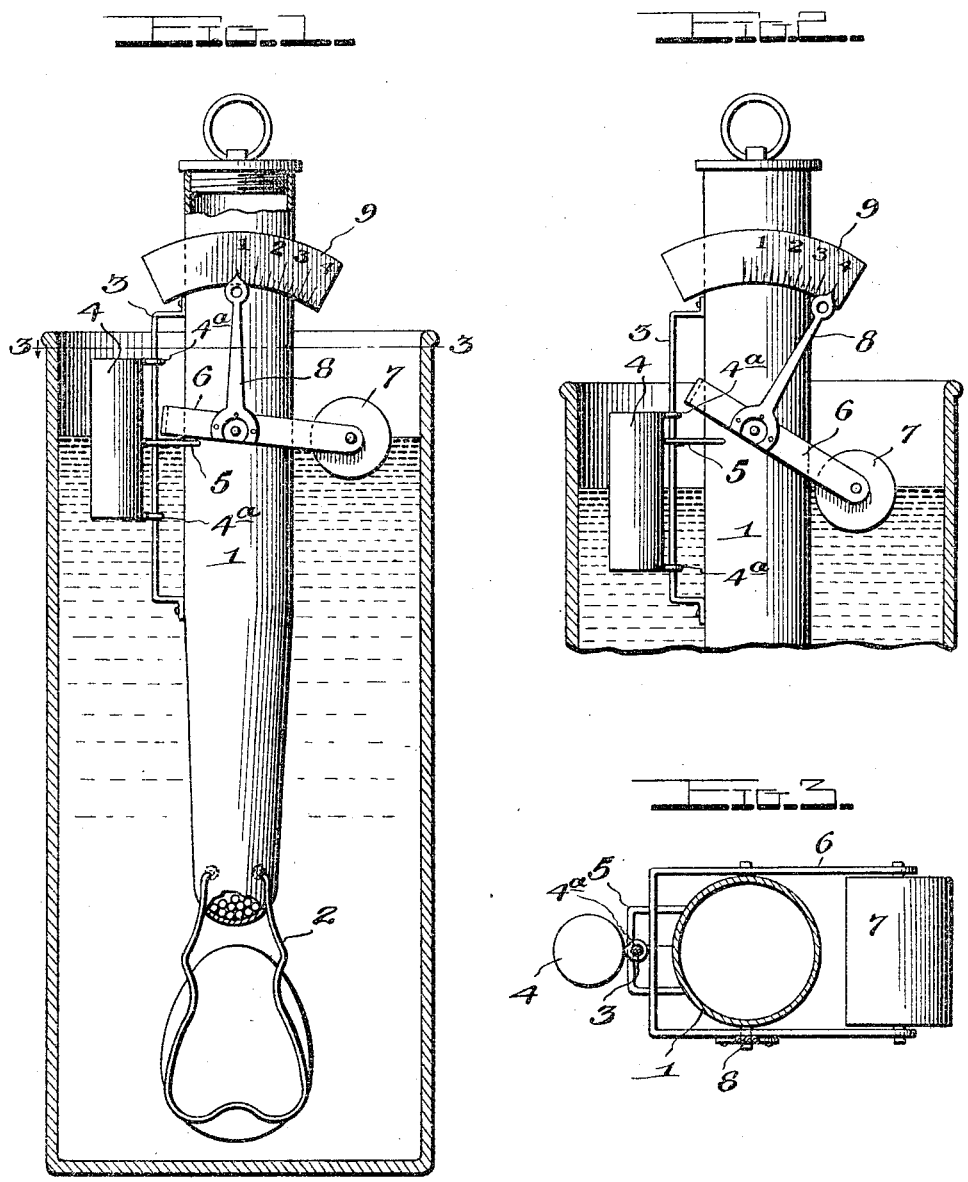
Witness
Chas. L. Griesbauer.
Inventor
William A. Fox,
By E. B. McBath
Attorney

UNITED STATES PATENT OFFICE.

WILLIAM A. FOX, OF GREELEY, KANSAS.

EGG-TESTER.

1,210,788.

Specification of Letters Patent.   Patented Jan. 2, 1917.

Application filed May 17, 1916.   Serial No. 98,176.

*To all whom it may concern:*

Be it known that I, WILLIAM A. FOX, a citizen of the United States, residing at Greeley, in the county of Anderson and State of Kansas, have invented certain new and useful Improvements in Egg-Testers, of which the following is a specification.

This invention relates to a specific gravity egg tester and is an improvement on the device shown and described in the patent granted to me March 7, 1916, No. 1,174,841.

The particular object of the improvement is to provide for more delicate measurements, to make the movement of the indicating mechanism of greater extent and therefore more easily read and to otherwise improve the general construction.

With these objects in view the invention consists in the novel features of construction hereinafter set forth, pointed out in the claims and shown in the accompanying drawings, in which:—

Figure 1 is a side elevation, a water containing vessel being shown in section. Fig. 2 is a detail view of the upper portion of the device, the indicating hand being in position to show that the egg being tested is bad. Fig. 3 is a section on the line 3—3 of Fig. 1.

In the drawings 1 designates the upright tubular float which carries at its lower end the wire clamps 2, only one of which appears, which hold the egg to be tested. In the patent mentioned these clamps were soldered to the tube or float, but as this is of aluminum I find it advisable to extend the ends of the wire into the float and head or rivet on the inside, after which the tube is sealed.

A vertical bracket 3 is carried by the float 1 and on said bracket is slidably mounted a float 4. This float is cylindrical in form and in the previous invention the bracket passed centrally, longitudinally, through it. I find that it is desirable to provide the float 4 with laterally extending end lugs 4ª perforated to work loosely on the bracket. It is of course understood that the float 4 remains practically stationary, and that the float 1 rises and falls, depending on the specific gravity of the egg carried by it. As the float 4 is hollow I found that when the bracket went through said float there was danger of leakage, or if a water tight joint or packing was used the freedom of movement of the bracket with respect to the float was interfered with. This is entirely avoided by using the lugs 4ª. Angled guide arms 5 are carried by the tubular float 1 and prevent rotation of the float 4, or prevent its swinging around and coming into contact with the float 1 and parts carried thereby.

Pivoted on the tubular float is an open rectangular frame 6 in the open end of which is mounted a cylindrical float 7, arranged horizontally. A pointer 8 is carried by the frame 6 and said pointer works over a scale beam or plate 9.

I have found that with the float 4, which has no part in operating the index hand or pointer, omitted, the float 1 would not occupy a strictly perpendicular position and the reading would be incorrect, the inaccuracy increasing with the staleness of the egg. I also found that if a fresh egg was improperly positioned, as for example crosswise in the holder formed by the clamps 2, that the float 1 would be thrown from the perpendicular unless counterbalanced by the float 4. This counterbalancing effect is further increased by my present manner of mounting float 4 which moves it farther from the float 1.

The graduations on the scale indicate various degrees of freshness of the egg, running from 1 upwardly. The older the egg the less its weight and the float 1 will rise tilting the frame 6 and carrying the pointer over the scale, as in Fig. 2.

The principle on which the device operates was fully set forth in the patent above referred to.

The floats 4 and 7 may be constructed of cork if desired.

What I claim is:

1. The combination with an egg supporting float, a pivoted frame carried thereby, a float carried by said frame, and to one side of the first mentioned float, a pointer carried by the frame, a transverse scale carried by the first mentioned float and over which said pointer works, and a counterbalancing float supported by the first mentioned float and on the side opposite the second mentioned float.

2. An egg tester comprising a float adapted to maintain an upright position in a liquid, means for holding an egg at the lower end of said float, a vertical bracket on the float, a second float, lugs carried by the second float and through which said bracket loosely passes, guide arms carried by the first mentioned float and preventing swinging movement of the second mentioned float, a pivoted frame on the first mentioned float, a third float carried by said frame, a pointer carried by the frame, and a scale beam carried by the first mentioned float.

In testimony whereof I affix my signature.

WILLIAM A. FOX.

Copies of this patent may be obtained for five cents each, by addressing the "Commissioner of Patents, Washington, D. C."